Sept. 8, 1964 E. H. LAND 3,147,699

COLOR PRINTING PROCESS

Filed Aug. 4, 1960 2 Sheets-Sheet 1

INVENTOR.
Edwin H. Land
BY
Brown and Mikulka
ATTORNEYS

INVENTOR.
Edwin H. Land
BY
Brown and Mikulka
ATTORNEYS

United States Patent Office 3,147,699

Patented Sept. 8, 1964

3,147,699

COLOR PRINTING PROCESS

Edwin H. Land, Cambridge, Mass., assignor to Polaroid Corporation, Cambridge, Mass., a corporation of Delaware Filed Aug. 4, 1960, Ser. No. 47,551

2 Claims. (Cl. 101—211)

This invention relates to the graphic arts and more particularly to printing methods and products which may advantageously be employed therein.

The present invention is a continuation-in-part of my co-pending applications Serial No. 504,545 for Color Image Formation, filed April 28, 1955, now U.S. Patent 3,003,391; Serial No. 809,407 for Formation of Photographic Images, filed April 28, 1959; and Serial No. 32,283 for Method and System for Producing and Viewing Multicolored Images, filed May 27, 1960. It is principally directed toward a novel method of forming a printed multicolored image in which printing inks essentially of but a single neutral or monochromatic tone are employed as the medium for printing a composite image on a specially prepared color screen which may be in the form of a printing paper or other suitable print-receiving material. The image is composed of two or more properly registered, positive records of the color content of a multicolored photographic subject. Assuming, for example, the use of two color-separation records obtained through the use of red and green taking filters and both rendered in a neutral tone, one is representative of the long wavelength or "warm" color content of the subject such as the red, orange and yellow; the other is representative of its short wavelength or "cool" color content as, for example, the green or blue.

The method of the present invention, in its use of essentially uniformly toned inks in printing the aforesaid records on color screen printing surfaces, is fundamentally in marked contrast to conventional graphic arts color practices wherein the color-providing substances are embodied in the colored inks used in printing the color-separation records as, for example, the yellow, magenta and cyan printing inks conventionally employed in printing processes. By the present method, however, an entire gamut of colors may be provided in an image through the medium of a novel printing paper or other print-receiving material having throughout its area an arrangement or pattern of screen elements of one or more colors, upon which are selectively or discriminatingly printed, e.g., in a neutral tone, the images or records representative of the color content of the subject.

Formation of the multicolored image may herein be considered, in general, as achieved through an additive synthesis. The selective printing of the images on the proper screen elements, namely, printing a long wavelength record selectively on screen elements which permit substantially only a long wavelength color stimulus to function relative thereto and printing a short wavelength record selectively on screen elements which permit substantially only a short wavelength color stimulus to function relative thereto is, in general, obtained through the provision and use of printing substances and screen elements having specially chosen characteristics of affinity or repellence with respect to one another.

The method and materials employed herein are adapted to employ certain features of techniques known in the printing art such, for example, as those employed in line, halftone or full-tone reproduction and classifiable under such headings as letterpress, gravure, lithography (offset), collotype, and matrix dye transfer.

Objects of the present invention are to provide a printing method for the graphic arts which in certain respects is simplified and economical with respect to other known printing methods; to provide visibly multicolored printed images which possess predetermined and accurate color qualities; to provide a printing method wherein applied inked impressions are automatically limited to reception by certain screen elements of a printing surface; to provide a printing method in which screen elements of but a single color are employed to form a printed image exhibiting a gamut of colors; to provide multicolored printed images through the use of a neutral-toned printing substance or substances such as printing inks with printing surfaces having colored screen patterns formed thereon; to provide printing substances and screen-type printing surfaces which are inherently or which are rendered selectively receptive and repellent with respect to one another; to provide, through a method of the character described, prints which exhibit a gamut of colors in reflected light or in transmitted light; and to provide a printing method which is compatible with, and which may utilize, and therefore benefit economically from, various known techniques of the graphic arts such as those associated with engraving and photoengraving and including both letterpress and intaglio, as well as lithography and photolithography, including offset printing for producing line, halftone and full-tone representations.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
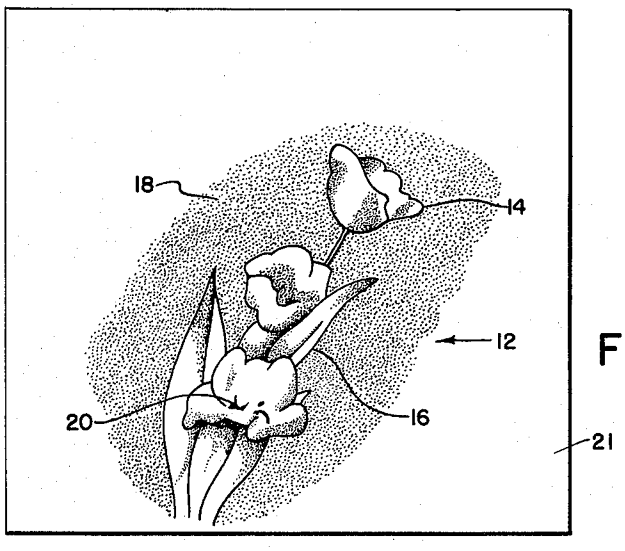
FIGURE 1 is a diagrammatic view of a photographic subject which is to be reproduced through the printing method of the present invention.

With reference to FIG. 1, there is illustrated a photographic subject which is to be reproduced through the printing method of the present invention. It may be assumed, for example, that the subject is an original full-tone, multicolored photographic print, the flowers 14 being red, the leaves 16 green, and the background 18 blue. Neutral-toned portions are also indicated at 20. The shading, which is characteristic of a full-tone or continuous image in its various portions, is merely suggested and is to be regarded as actually more completely present therein. While a subject of but three colors is shown in FIG. 1, the number of colors has been chosen merely for convenience of explanation and it is to be understood that the present method is adapted to the reproduction of a subject possessing a gamut of substantially any number of colors. In the example shown, the red of the flowers may be considered as constituting the long wavelength or "warm" color content of the subject and the green of the leaves and blue of the background as forming the short wavelength or "cool" color content thereof.

Figure 2:
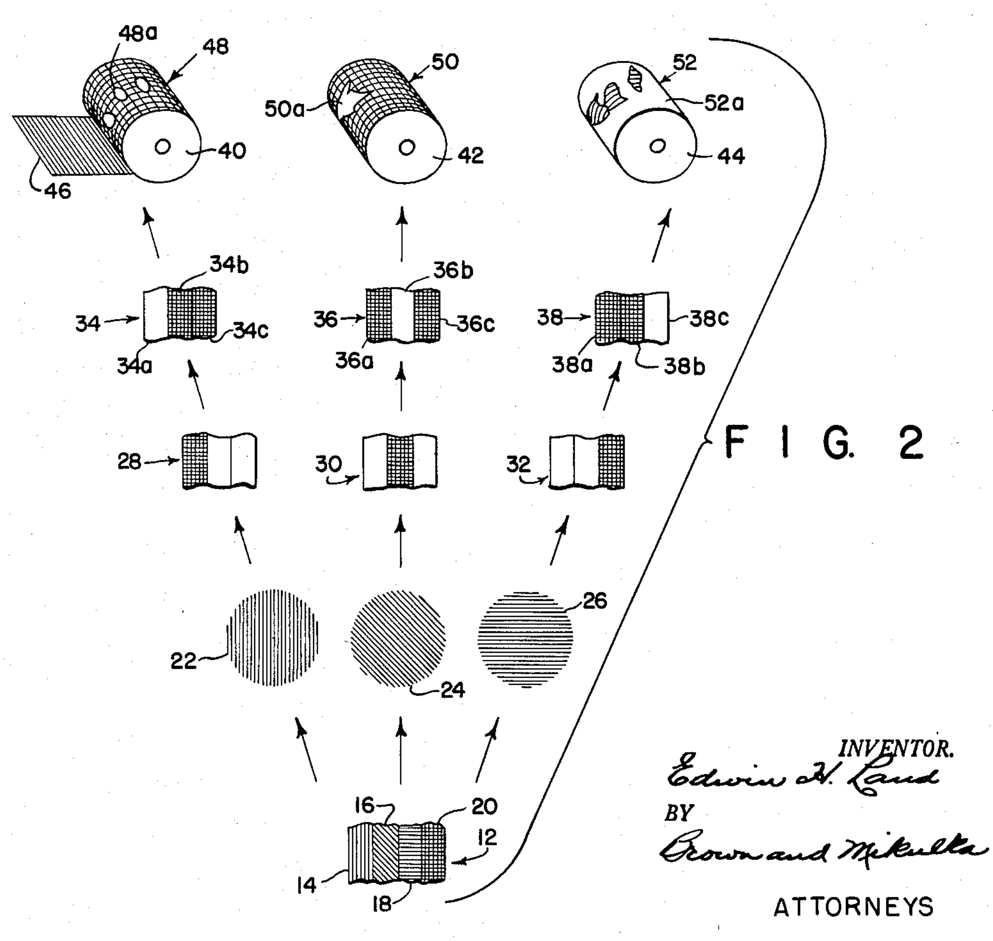
FIG. 2 is a diagrammatic representation illustrating the major steps involved in forming a multicolored print, both preparatory to and including the method of the present invention.

In FIG. 2, certain of the principal steps in a "three-color" method of producing a multicolored print, are diagrammatically illustrated. The greater number of the steps shown, namely, those relating to the formation of color-separation negatives and positives through operations which are strictly of a photographic nature, are to be regarded as generally conventional and preliminary to the method of the present invention. They are included in the diagrammatic illustration merely to show the chain or sequence of procedural steps which exists between the camera's "seeing" the multicolored photographic subject and the printing method of the invention.

A fragmentary area of the photographic subject 12 of FIG. 1 is shown in FIG. 2 including the red portion 14, green portion 16, blue portion 18, and neutral portion 20. The steps of forming black-and-white color-separation records are represented by the red, green and blue taking filters 22, 24 and 26, the fragmentary exposed and processed areas of negative photographic film material 28, 30 and 32, and the fragmentary exposed and processed areas of positive photographic film material 34, 36 and 38 formed from the negatives.

The density-containing and clear portions of the aforesaid negative and positive record areas, indicated in FIG. 2 by the presence or absence, respectively, of cross-hatching, relate, of course, to the arrangement or pattern of the different colors in the photographic subject. It will be noted, for example, that by means of the red taking filter 22 and the intermediate step of processing and printing from the negative 28, a substantially clear portion 34*a* of the positive color-separation record 34 is produced which is identified with the red portion 14 of the photographic subject. The green and blue portions 16 and 18 of the photographic subject, in turn, produce density portions 34*b* and 34*c* of the positive record 34. Similarly, clear portion 36*b* of a second positive color-separation record 36 is identified with the green portion 16 of the photographic subject and density portions 36*a* and 36*c* are representative of the red portion 14 and blue portion 18 thereof. Clear portion 38*c* of the third positive color-separation record 38 is identified with the blue portion 18 of the photographic subject, while density portions 38*a* and 38*c* are representative of the red and green portions thereof.

It is to be understood that the above-described clear portions of the color-separation records 34 are not completely devoid of densities but that they contain density areas depending upon the presence of less than full color, of continuous tone or shading, or of line content which, perhaps, includes printed matter, in the photographic subject in corresponding portions. Certain image-forming elements such as lenses, light sources, and the like, have intentionally been omitted from FIG. 2 inasmuch as they are conventional and the illustration is not intended to depict an optical system but, rather, a series of operational steps leading up to the printing stage. Thus, it will be understood that lens elements may be employed in forming at least the photographic negatives and that halftone screens may also be used in their production, or that contact exposures may be performed, depending upon the type of subject material to be reproduced and the form of printing plate or other element which is to be employed in the printing process.

Printing means such as rotary press plate impression cylinders or offset rolls, for printing image records of a given tonal quality, e.g., a neutral tone, and representative of the red, green, and blue color content of the photographic subject are diagrammatically represented at 40, 42 and 44, respectively. A screen-surfaced printing material 46, of a novel type containing, for example, red, green, and blue stripes and to be further described hereinafter, is shown at a position for receiving selectively on certain of the striped portions thereof a black-and-white or monochrome inked impression portraying the red color content of the subject from the printing surface 48 of the printing means 40. After receiving this impression, the printing material is treated in succession by printing means 42 and 44 so as to receive black-and-white or monochrome inked impressions from printing surfaces 50 and 52 thereof representing the green and blue records, respectively, of the color content of the subject, it being understood that, if desired, three printing plates or the like can, alternatively, be mounted successively on a single roll rather than on separate rolls and run off in sequence.

Further referring to FIG. 2, it is, of course, imperative as a general practice to so print the impressions of the color-separation records that they are in proper register with one another. Any conventional mechanical or electronic register control means suitable for this purpose may be employed. Neutral-toned portion 20 of the photographic subject, although not shown as reproduced in the negatives 28, 30 and 32, in the positives 34, 36 and 38, or on the printing surfaces of printing means 40, 42 or 44, will be contained to some extent in each of these elements because light from portion 20 is, of course, passed by each of the filters 22, 24 and 26. While certain areas 48*a*, 50*a* and 52*a* of the printing surface which correspond to the image portions of the subject of FIG. 1 are shown as completely clear, it is to be understood that densities representative of the line and continuous tone content of the photographic subject within the image portions are present in these areas.

Figures 3, 4, 5:
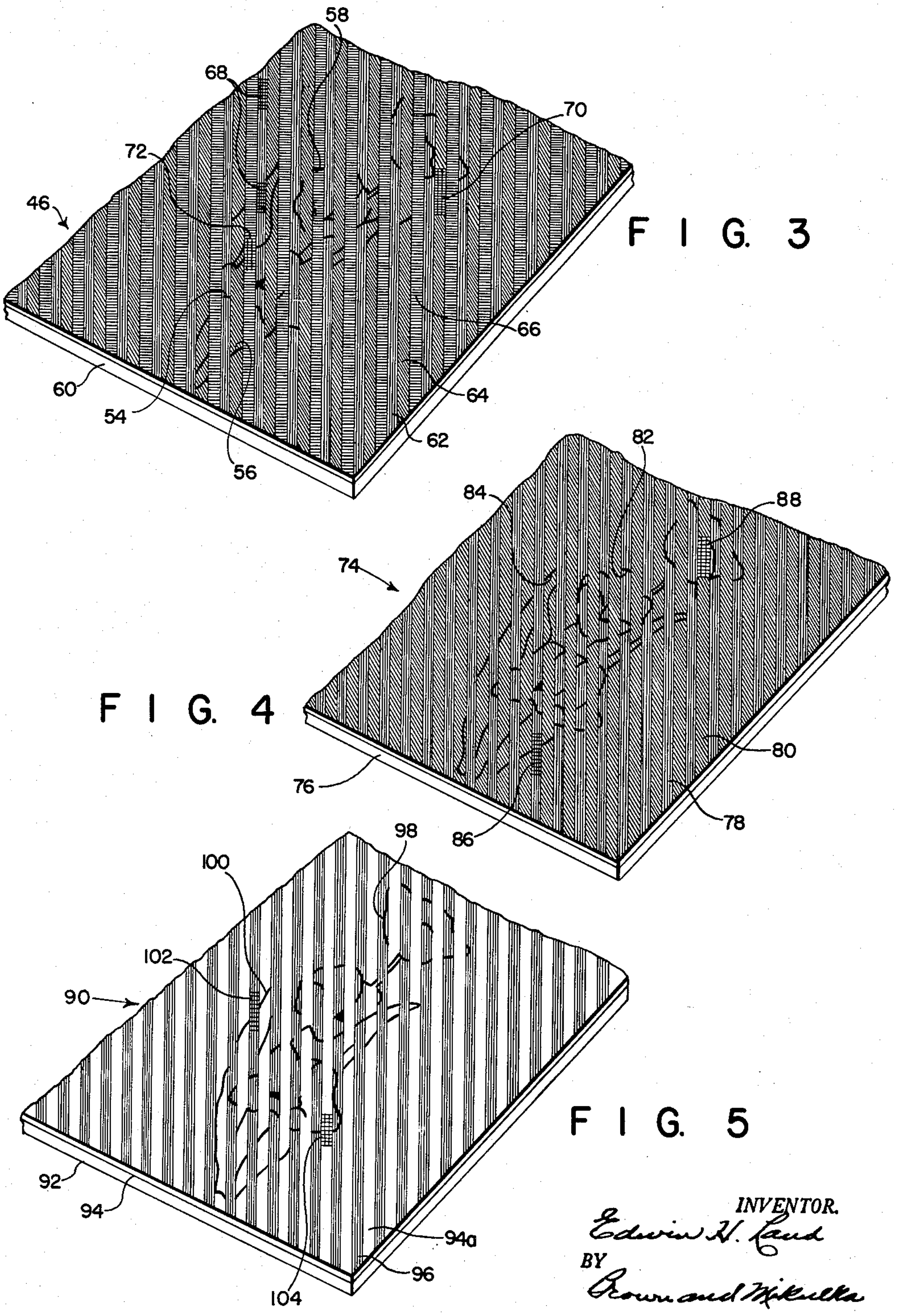
FIG. 3 is a diagrammatic, fragmentary, perspective view of one type of printing material of the invention illustrating the method in which neutral-toned color-separation records of the photographic subject of FIG. 1 are printed thereon.
FIG. 4 is a similar view of a second type of printing material showing the formation thereon of neutral-toned color-separation records of the photographic subject of FIG. 1.
FIG. 5 is a similar view of a third type of printing material illustrating the method of printing thereon neutral-toned color-separation records of the photographic subject of FIG. 1.

In FIG. 3, there is shown the sheet of "three-color" printing material 46, and in terms of outline portions, only, the limits 54, 56 and 58 of inked impressions printed selectively thereon from printing surfaces 48, 50 and 52 in neutral-toned inks, these impressions, together, forming the image of FIG. 1. The image thus formed is visible in a gamut of colors. The inked impressions 54, 56 and 58 are indicated in FIG. 3 merely in outline to avoid completely covering the screen lines with densities which would render the underlying structure of the screen invisible in the illustration, it being understood that densities would be present, selectively, throughout a large part of the area, as explained more fully hereinafter.

Printing material 46 comprises a base 60 which may be formed of a transparent, a translucent, or an opaque sheet material, depending upon the intended usage of the print, e.g., it may be a paper, a plastic, a textile, a metal, etc. A plurality of sets or groups of screen elements 62, 64 and 66, differentially colored and each set being receptive to but one of the printing inks employed, is formed on the surface of base 60. Although the screen elements are shown in the form of relatively large stripes arranged in parallel relation, it is to be understood that they are greatly exaggerated in size and would actually preferably be of a size smaller than that which can be resolved by the human eye at intended viewing distances or possible magnifications. It is further to be understood that the screen elements, although generally designated as stripes, may be of other shapes and that they may either be of a geometric regular type or of one which, in toto, provides an irregular mosaic.

The differentially colored screen elements, namely, the red elements 62, green elements 64 and blue elements 66, are arranged geometrically in this sequence throughout the sheet 46. Assuming, for example, the intended use of three printing inks of a generally uniform tonal quality for printing the color-separation images, e.g., black, but having other differential vehicle and pigment characteristics, namely, a greasy printing ink, a water-soluble basic dye printing ink and a water-soluble acid dye printing ink, in forming the image portions 54, 56 and 58, respectively, the red stripes 62 may be formed of a substance which is receptive only to the greasy printing ink such as an oil varnish which contains a red pigment, the oil vehicle being of a selected natural or synthetic type. Green stripes 64 are formed of a substance which is receptive to the basic dye printing ink but which is repellent in both the greasy printing ink and the acid dye printing ink as, for example, a gelatinous substance containing a green pigment and a basic dye mordant such as polystyrene sulfonic acid. Blue stripes 66 are then formed of a substance which is receptive to the acid dye printing ink but which is repellent to both the greasy printing ink and the basic dye printing ink, an example of which is a gelatinous substance containing a blue pigment and an acid dye mordant such as deacetylated chitin.

The screen stripes 62, 64 and 66 may be formed on base 60 by any of various possible methods. One such method consists of printing the screen stripes sequentially from individual inked printing plates, e.g., of a gravure type, care being exercised to obtain proper registration and to prevent overlap of the lines of the respective sets. A second method contemplates coloring the entire surface of base 60 and then forming the second and third sets of stripes thereupon, the first set being the interstices composed of the colored surface. Another method comprises the use of offset blanket cylinders for forming the sets of screen elements. A fourth method contemplates forming the stripes as a continous process on a moving length of a sheet material as, for example, by the extrusion of properly viscous and rapidly-solidifying pigmented fluid compositions from one or more extrusion or dispensing heads having predeterminedly dimensioned and spaced apertures. Other methods of producing the screen pattern will be described hereinafter.

In employing substances of widely different characteristics in forming the screen elements, it may be necessary to provide special surfacing materials or subcoats to insure proper adhesion to base 60. Assuming, for example, a cellulosic base such as regenerated cellulose, cellulose acetate or cellulose acetate butyrate, the red varnish greasy ink-receptive stripes 62 may be formed directly thereon. A subcoat, such as a gelatinous coating, a baryta-type coating, a coating of polyvinyl alcohol, or another suitable type of coating, is applied throughout the surface area, the green basic dye printing ink-receptive stripes 64 are overlaid thereon in juxtaposed relation to the red stripes, and the blue acid dye printing ink-receptive stripes 66 are applied thereto next to the green stripes. Alternatively, one of the sets of stripes may be formed by rendering the entire surface of the sheet selectively receptive to but one of the printing inks and overlaying the other two sets of screen elements thereupon, leaving areas of the sheet surface uncovered to form the third set of elements. A protective or otherwise functional final coating may be applied to the surface if desired. It will be understood that each subcoat and each set of stripes is sufficiently solidified prior to application of the next subcoat or set of stripes so that any undesirable smearing or merging is avoided.

The printing operation, as more specifically relating to the reproduction of the photographic subject of FIG. 1, will now be described, it being understood that all of the printing inks are of a similar neutral or monochrome tone and have the aforementioned characteristics of affinity or repellence with respect to the screen elements of sheet 46.

The first printing step of applying the red color-separation record from printing means 40 consists of printing an inked impression, shown in part by cross-hatching 68, on the red screen stripes 62, both within the area of the leaves 16 of FIG. 1 and throughout the area of the surround or background 18, thus reducing these stripe portions substantially to a neutral tone. It also includes the printing of any existing lines and shading on the red lines within the area of the flowers 14.

The second printing step of applying the green color-separation record from printing means 42 consists of printing the inked impression, shown in part by cross-hatching 70, on the green screen lines 64, both within the area of the flowers 14 and throughout the area of the surround 18. It also includes the printing of any existing lines and shading on the green lines within the area of the leaves 16.

The third printing step of applying the blue color-separation record from printing means 44 consists of printing the inked impression, shown in part by cross-hatching 72, on the blue screen lines 66, both within the area of the flowers 14 and the area of the leaves 16. It may print lightly or perhaps not at all on the blue lines within the area of the surround, depending upon the pictorial quality of the surround. Area 21 of FIG. 1 which contains no density would receive no inked impression.

In FIG. 4, there is illustrated a sheet of a "two-color" printing material 74 containing an image which is visible in a gamut of colors. The sheet 74 comprises a base 76 of a material similar to that of FIG. 3 and a color screen composed of red stripes 78 and green stripes 80 formed thereon. Assuming, for example, the use of a greasy printing ink and a water-soluble printing ink in printing the color-separation image records thereon, stripes 80 are formed of an appropriate natural or synthetic oil varnish which is receptive only to the greasy printing ink which contains a red pigment. The green screen elements 80 are formed of a water-soluble dye, or the like, applied directly to base 76, assuming the latter to be hydrophilic, or applied to a hydrophilic coating which has previously been formed on the base. The screen elements may be printed or otherwise formed in a manner described relative to FIG. 3 or elsewhere herein. The linear limits, only, of the two color-separation records constituting the two inked impressions overlying the red and green stripes are shown and are numbered 82 and 84, respectively.

Rendition of a multicolored replica of the subject of FIG. 1 in terms of two neutral-toned or monochrome printing inks of differential receptivity as shown in FIG. 4, e.g., one a greasy ink and the other a water-soluble ink, is as follows. By the first printing step, the red color-separation record is printed in the greasy ink, from a printing means of the character previously described, as an inked impression, shown in part by cross-hatching 86, on the red lines within the area of the leaves and background, but only to the extent required to depict lines or shading within the area of the flowers.

By the second printing step, the green color-separation record is printing in the water-soluble ink as an inked impression, shown in part by cross-hatching 88, on the green lines within the area of the flowers and to some extent within the area of the background. Printing within the area of the leaves is performed only to the degree necessary to depict lines or shading within these areas. It is, of course, to be assumed that the green screen elements are properly hydrophilic. It may further be assumed that essentially red and green taking filters have been employed in the original photography.

FIG. 5 illustrates a sheet of a "one-color" printing material containing a pair of color-separation records, together providing an image which is visible in a plurality of colors. Sheet 90 comprises a base 92 consisting of an opaque, a translucent or a transparent paper, plastic or other suitable material, depending upon whether the print is to serve as a reflection print or a transparency, or whether some other consideration of intended use is controlling. A substantially white or transparent hydrophilic layer 94 is formed on the base. Layer 94 includes a color screen composed of red stripes 96 which are receptive to one type of printing ink, only, e.g., a greasy ink, and interstices *94a* which are receptive to a second type of printing ink, only, e.g., a water-soluble printing ink. The interstices or stripes 94a are inherently white or may be uncolored and transparent and derive a whiteness from the underlying base 92.

The linear limits, only, are shown of the color-separation records of the principal subject matter of FIG. 1, namely the flowering plant, in terms of the two inked impression limits 98 and 100 which overlie the red and the white stripes, respectively. It may generally be assumed that essentialy red and green taking filters were employed in the initial photography concerned. Assuming the use of printing inks of the aforesaid differential affinity and repellence characteristics, each being of a neutral tone, for printing the "warm" and "cool" color-separation records, respectively, a multicolored replica of the subject of FIG. 1 is produced as follows. By the first printing step the red or "warm" color-separation record is printed on the red lines within the area of the leaves and within the area of the surround or background. The red lines within the area of the flowers receive an inked impression only to the extent that they contain shading or linear definition present in the original subject 12 of FIG. 1.

By the second printing step, the green or "cool" color-separation record is printed on the white lines within the area of the flowers. The white lines within the area of the leaves are printed upon to the extent that the leaves contain shading or other delineation. Within the area of the surround or background, the white lines may contain some densities, e.g., a gray tone, the lighter densities here being, perhaps, due to the fact that the green taking filters do not record blue too satisfactorily. The white area of the surround is reproduced by the screen lines, devoid of any inked impression. The inked impressions of the red and green records are further illustrated by cross-hatching portions 102 and 104, respectively, as contained in portions of the screen lines above designated.

Further considering the novel color screen type of printing paper or other printing materials of the present invention which are employed with the selectively-applied, neutral-toned or monochrome inked impressions to provide multicolored images, various modifications may exist in the process of forming, or in the structure of these printing materials as well as in the method of printing the inked impressions. One such modification contemplates first printing, in a water-soluable ink, a neutral-toned record of the "warm" or green color content of the subject on a hydrophilic surface of the printing material. A color screen composed of predeterminedly spaced, substantially opaque stripes or other screen configurations is then printed or otherwise fixedly superimposed on the printed image record. The stripes are rendered in a substance preferentially receptive to a given printing ink, e.g., they are formed of a red pigmented oil varnish which is receptive only to a greasy printing ink. A neutral-toned inked impression of the "cool" color content of the subject is printed in a water-soluble printing ink on the interstices or stripes of hydrophilic material, only, lying between the red stripes. A neutral-toned inked impression of the "warm" color content of the subject is printed in a greasy ink on the red stripes, only. Alternatively, the surface of the sheet may be rendered greasy ink-receptive and the red screen elements formed thereupon in a water soluable ink-receptive substance, the record of the "warm" color content then being formed in a water-soluable printing ink and the record of the "cool" color content being formed in a greasy printing ink.

In the process of forming the color screen configurations of a one-or two-color printing material of the character described, such, for example, as the stripes shown herein, the printing material may first be coated with a hydrophilic and greasy printing ink-repellent substance such as gelatin, adequately humidified. Screen stripes of a hydrophobic and greasy printing ink-receptive oil varnish are printed in predetermined spaced relation on the coated material. The varnish contains a red dye or pigment.

Alternatively, a hydrophilic layer or coating may be colored red throughout its area or, if transparent, the supporting base may be colored red. Opaque white screen elements such as greasy printing ink-receptive white stripes are then overlaid on the hydrophilic coating. The water-soluble printing ink impression of the "warm" color content is applied substantially exclusively to the hydrophilic coating screen areas lying between the white stripes and the greasy printing ink impression of the "cool" color content is applied substantially exclusively to the overlaid white stripes.

Where, for example, it is desirable to balance the relative luminosities of color stimuli or image intensities, or of a color stimulus, such as red, with white, a luminescent substance, e.g., a fluorescent dye may be used, assuming the presence of ultraviolet light for viewing purposes. Providing an imbalance between the total area of one set of screen elements, for example the red, and that of another set, the white, may also be employed for a somewhat similar purpose. Various combinations of color-providing stimuli may be used in forming a two-color screen, e.g., red or orange with cyan, green or blue; red, green or blue with red, gray or cyan; yellows of different wavelength, etc. Some alterations of the colors of a three-color printing material from those described may also be possible. An effective three-color screen may, for example, employ white elements as one of the three screen "color" components.

A further method of providing multicolored images consists of forming a screen pattern on a paper or other base material in terms of black and white elements, e.g., a screen composed of black stripes interspersed with clear or white stripes. One set of stripes, for example the white, is hydrophilic and thus receptive to a water-soluble printing ink but repellent to a greasy printing ink. The other set, for example the black, is hydrophobic but receptive to a greasy printing ink. The "warm" color content of the subject is printed as an inked impression in a red opaque greasy ink, or in a red luminescent greasy ink on the black stripes only. The "cool" color content is printed as a neutral-toned ink impression on the white stripes only.

Still another modification contemplates the use of an all-over inherently greasy ink-receptive printing surface. A colored screen such as a red screen of a hydrophilic material is applied thereto. A first inked impression, e.g., that representative of the "cool" color content, is formed in a greasy ink, exclusively on the portions receptive thereto. A second inked impression, e.g., that representative of the "warm" color content, is formed in a water soluble ink, only on the red screen portions. One or both inked impressions may, advantageously, be applied prior to complete drying of the screen elements and the second inked impression prior to complete drying of the first.

Another modification involves the use of printing inks which are substantially identical for forming two or more color-separation inked impressions. Inks which are uniform would, of course, have not only a single tonal quality such as the neutral tone previously mentioned, but would be similar in all other respects, namely, in vehicle, pigment, etc. Accordingly, the selective application of the printing ink to individual sets of screen elements would depend substantially entirely upon differential qualities of receptiveness and nonreceptiveness for the ink which were present or which were additionally provided in the screen elements of the printing sheet alone. Assuming, for example, that there are two sets of screen elements and that one set is receptive to the printing ink and the other is nonreceptive thereto, an inked impression of a first color-separation record is applied and formed exclusively on one set of the screen elements. The receptivity and nonreceptivity characteristics of the screen elements with respect to the printing ink are then reversed as, for example, by the application of a processing liquid providing a chemical reaction with materials of the screen elements, such as a reversal of ionization properties thereof or the like, following which, an inked impression of a second color-separation record is applied.

It is desired not to be limited to the specific materials previously described herein in the composition of the screen elements and printing inks, for rendering them selectively mutually receptive or non-receptive, as the case may be. A wide range of materials and methods may be employed for the purpose. Thus, in the three-color embodiment of FIG. 1, the first set of stripes may essentially comprise a pigmented oil varnish, the second a polymer and pigment, and the third a dyed gelatinous composition, selectively receptive to printing inks having, respectively, oil, alcohol and water as solvents. Another combination of solvents for use in forming screen elements and printing inks may include a hydrocarbon, such as toluol or xylol, water, and alcohol. Or, for example, the material of a first set of screen elements may be of a type in which a residue is formed on its surface which, of itself, or by virtue of a masking agent applied thereto or reacting therewith, is rendered receptive to a different type of printing ink from that of a second set of screen elements. Assuming a two-color embodiment, the first set of screen elements may be greasy ink-receptive and water repellent and composed of a compound having large molecules, e.g., a long-chain plastic such as an acrylic resin solution having approximately 30% solids in 2-ethoxyethyl acetate. The second set of screen elements may then be greasy ink-repellent and water-receptive and composed of polyvinyl alcohol.

Other substances or properties possible of incorporation in the screen elements or printing inks or methods employed to achieve the differential characteristics required comprise the use of substances having relatively different drying or solidification characteristics; providing the "crystallization" of one set of screen elements, e.g., through the addition of cobalt after the application of a first inked impression, so that a second inked impression will not adhere thereto; polymerizing a set of screen elements to cause it to be selectively receptive to a printing ink; adding a small percent of substances such as waxes or tallow to a screen-forming mixture to improve the receptivity of screen elements to a given printing ink; adding a substance such as gum arabic to selectively reduce the receptivity of a set of screen elements to a printing ink; selectively employing metals which form amalgams and those which do not form amalgams in the formation of screen elements to provide a differential receptivity to printing inks; providing a high gloss on one set of screen elements, e.g., through the use of phenolic or alkyd resins; providing a matte surface on a set of screen elements, e.g., through the inclusion of a colloidal content; the selective use of ionic compounds or dyes of similar or opposite charge; employing a plurality of sets of screen elements or inks having differential drying properties and forming inked impressions thereon prior to complete drying of certain of said sets of screen elements; employing color screen-forming materials and printing inks which chemically react with other screen-forming materials and printing inks, or with substances contained in a printing paper to achieve differential printing ink receptivity or repellence characteristics; the employment of absorption type, flexographic type, and heat- or moisture-setting substances for providing selective qualities in the printing inks or screen elements; the use of pigments, chelates, complete dyes or dye intermediates as ingredients of the screen elements or printing inks to provide tonal qualities and desired qualities of substantivity, adhesion, repellence, or the like. Other materials suitable for the purposes above-outlined will be apparent to one skilled in the art.

While the use of printing inks of but a single tone has been stressed herein, it may, in certain instances be of advantage to employ, in the formation of a given multicolored appearing image, printing inks of two different tonal qualities and the present invention is intended to cover such a possibility. Furthermore, it is to be understood that a translucent colored printing ink may be employed to render an inked impression in a neutral tone where the colored ink and the colored screen element, to which it is applied, together provide a neutral tone, subtractively, e.g., through the application of a green printing ink on a red screen element.

A still further modification contemplates an electrical, e.g., an electrostatic, and more particularly, a xerographic adaptation of the broad principles presented herein of selective attraction and repellence of color screen elements with respect to color-separation record forming substances. Thus, for example, a photoconductive layer may have a color screen formed thereon, undergo a charge, and have the charge selectively dissipated from a first set of screen elements through their exposure to light, leaving the charge on a second set of screen elements only, the latter then being photographically exposed to a given color-separation record, or the like, and subjected to ionic spraying or an electroscopic powder to form thereon a neutral-toned image of the color-separation record. This procedure would then be substantially repeated for selectively forming a neutral-toned image on the first set of screen elements after recharging the photoconductive layer, selectively dissipating the charge from the second set of screen elements, exposing to a second color-separation record, and subjecting to the charged powder or liquid. The screen is formed of geometric sets of colored and uncolored elements or of elements of different colors. The photoconductive material can, for example, be a coated paper and be removed from its supporting layer as a finished product bearing a multicolored image or it can be transferred to a properly screened sheet. Selective masking means and the use of colored light in exposure would be employed, as necessary.

A modification contemplates forming a composite screen of two sets of linear photoconductive screen elements and sequentially charging, exposing, and treating the same with electroscopic particles or liquid. Another modification involves the use of electrodes with mutually insulated fields, arranged in a given design, underlying and properly aligned with a printing paper, or the like, having a geometric screen of one or more colors. Still another modification contemplates the use of spaced facing planar electrodes, at least one of which is transparent, providing a layer of selectively colored and insulated photoconductive particles on the surface of that electrode which faces the transparent electrode, applying a charge across the electrodes, and exposing the particles to an image of two or more colors through the transparent electrode, causing the particles to selectively migrate to the transparent electrode in the form of an image. While the foregoing method of forming a multicolored image involves the use of photoconductive particles of two or more colors, by using a geometric pattern of colored and uncolored particles, e.g., red and uncolored particles, with a geometric masking screen of similarly arranged opaque and clear portions in proper register therewith for exposure purposes, a multicolored appearing image can be formed.

Since certain changes may be made in the above processes and products without departing from the scope of the invention herein involved, it is intended that all matter contained in the above description or shown in the accompanying drawings shall be interpreted as illustrative and not in a limiting sense.

What is claimed is:

1. A process of producing a visibly multicolored printed image of a photographic subject containing a plurality of colors, comprising the steps of forming on a sheet material a screen composed of a plurality of sets of screen elements of at least two different tonal characteristics and having differential attraction and repellence properties with respect to image-forming printing inks employed in the process, applying a first inked impression of a given tonal quality to said screen, said inked impression being in the form of a color-separation image record of one part of the color content of said subject and having a property, when taken with the properties of said screen elements, which renders it substantially exclusively receptive by one of said sets of screen elements, and applying a second inked impression of a tonal quality substantially similar to that of said first inked impression to said screen, said second inked impression being in the form of a color-separation image record of another part of the color content of said subject and having a property, when taken with the properties of said screen elements, which renders it substantially exclusively receptive by a second set of said screen elements.

2. A process of producing a visibly multicolored printed image of a photographic subject containing a plurality of colors, comprising the steps of forming on a sheet material a screen composed of a plurality of sets of screen elements of at least two different tonal characteristics and having differential attraction and repellence properties with respect to image-forming printing inks employed in the process, at least one of said sets of screen elements being of a colored character, applying a first inked impression of a given tonal quality to said screen, said inked impression being in the form of a color-separation image record of one part of the color content of said subject and having a property, when taken with the properties of said screen elements, which renders it substantially exclusively receptive by one of said sets of screen elements, and applying a second inked impression of a tonal quality substantial similar to that of said first inked impression to said screen, said second impression being in the form of a color-separation image record of another part of the color content of said subject and having a property, when taken with the properties of said screen elements, which renders it substantially exclusively receptive by another set of said screen elements, said inked impressions being of a substantially uniform neutral tone.

References Cited in the file of this patent

UNITED STATES PATENTS

| | | |
|---|---|---|
| 1,618,533 | Hutchinson | Feb. 22, 1927 |
| 1,940,931 | Yound | Dec. 26, 1933 |
| 2,078,291 | Smedley | Apr. 27, 1937 |
| 2,243,486 | Ormond | May 27, 1941 |
| 2,467,229 | Pritzker | Apr. 12, 1949 |

FOREIGN PATENTS

| | | |
|---|---|---|
| 10,399 of 1907 | Great Britain | Apr. 30, 1908 |
| 406,933 | Great Britain | Mar. 8, 1934 |